May 5, 1931. W. H. F. SCHMIEDING ET AL 1,803,510
SEAL FOR REFRIGERATING APPARATUS
Filed April 30, 1928
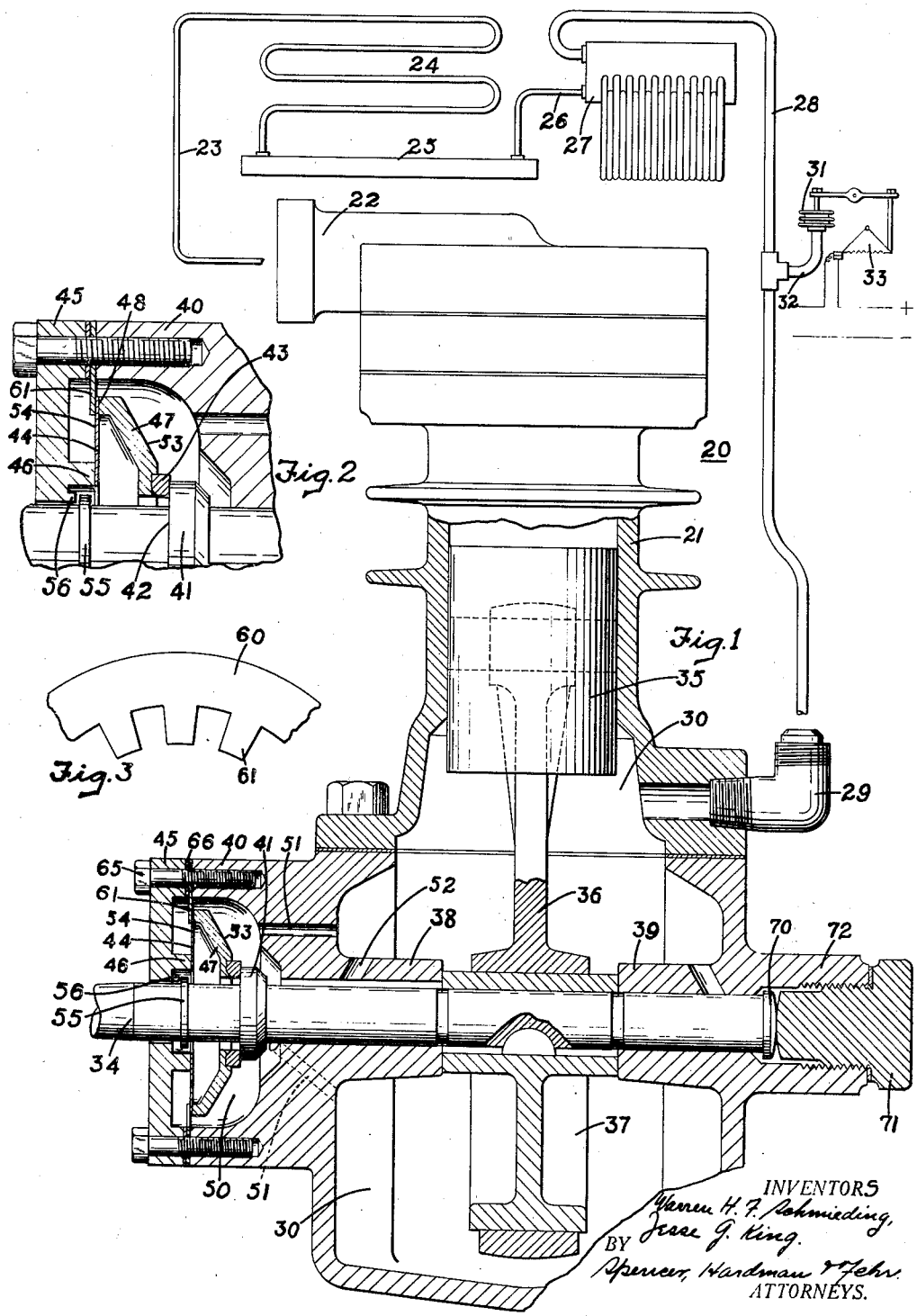
INVENTORS
Warren H. F. Schmieding,
Jesse G. King,
BY
Spencer, Hardman & Fehr
ATTORNEYS.

Patented May 5, 1931

1,803,510

UNITED STATES PATENT OFFICE

WARREN H. F. SCHMIEDING AND JESSE G. KING, OF DAYTON, OHIO, ASSIGNORS TO FRIGIDAIRE CORPORATION, OF DAYTON, OHIO, A CORPORATION OF DELAWARE

SEAL FOR REFRIGERATING APPARATUS

Application filed April 30, 1928. Serial No. 274,033.

This invention relates to refrigerating apparatus and more particularly to a seal for a shaft passing through a casing of the apparatus.

An object of this invention is to provide a seal for preventing the passage of air or gases along a shaft of the character hereinbefore described, which seal is adapted to have balancing refrigerant and atmospheric pressures applied thereto.

Another object of this invention is to provide a seal of the character hereinbefore described having a flexible wall and a rigid wall connected so that varying refrigerant pressures are balanced in said seal.

Another object of this invention is to reduce the spring pressures heretofore necessary in this type of seal to maintain the sliding surfaces in hermetic contact.

Further objects and advantages of the present invention will be apparent from the following description, reference being had to the accompanying drawings wherein a preferred form of embodiment of the present invention is clearly shown.

In the drawings:

Fig. 1 is a view partly in cross section, partly in elevation and partly diagrammatic of a refrigerating apparatus embodying features of our invention;

Fig. 2 is an enlarged cross sectional view of a portion of Fig. 1; and

Fig. 3 is an end view of a portion of the spring means shown in Figs. 1 and 2.

A refrigerating apparatus embodying features of our invention is generally designated as 20. It may comprise a compressor 21 delivering compressed refrigerant through outlet 22 and pipe 23 to a condenser 24. Refrigerant liquefied in the condenser 24 is delivered to a receiver 25. Liquid refrigerant passing through the pipe 26 may be controlled by a float controlled valve, not shown, in the evaporator 27. The refrigerant evaporated in the evaporator 27 is returned through the pipe 28 to the crankcase inlet 29 which returns the refrigerant to the compressor, in this embodiment, at the crankcase 30. An automatic control for the operation of the compressor may comprise an expansible bellows 31 connected through a pipe 32 to the pipe 28. The bellows 31 controls a snap switch 33 which starts and stops an electric motor. The motor may be drivingly connected to the shaft 34 by means of a belt passing over a pulley at the end of the shaft.

A compressor 21 may have a reciprocating piston 35 operated by a pitman 36 drivingly connected to an eccentric 37 which is keyed on the shaft 34. The shaft 34 operates in bearings 38 and 39 and passes through a casing of the apparatus which, in this particular embodiment, is the crankcasing 30.

The seal for the shaft may include a shoulder 41 on the shaft 34 having a radial bearing surface 42. A ring 43 of relatively self-lubricating metal may form a sliding hermetic connection with the bearing surface 42. This hermetic connection is one of two hermetic connections provided for the seal. The other hermetic connection may be formed by joining a flexible wall 44 to an end plate 45. For convenience, this joint may be formed on an axial shoulder 46 formed on the end plate 45 and the joint may be made by soldering or brazing the flexible wall 44 to the shoulder 46. The wall 44 extends radially outwardly from the shoulder 46. The ring 43 may be connected to a rigid ring 47 which may be hermetically joined to the flexible wall 44 at the point 48.

The pressure within the refrigerating apparatus may be conveyed to the cavity 50 surrounding the seal through passages 51 and 52 which also provide for the passage of lubricant into the cavity. These pressures may act on the side 53 of ring 47 and on the side 54 of wall 44. Since the mean effective pressure distances of the shoulder 46 and the bearing surface 42 from the axis of the shaft 34 are substantially equal, the pressures on the sides 53 and 54 practically counterbalance each other. These counterbalancing pressures are made available through the rigidity of the ring 47. Thus there is no tendency to move the ring 43 either toward or away from the bearing surface 42.

Blow-off means is provided to relieve the apparatus from excessive refrigerant pressures under abnormal conditions, such as in the case of a fire in the building wherein the apparatus is located. As an embodiment, the effective area of surface 53 may be made somewhat larger than the effective area 54. Means for arresting excessive axial movement of shaft 34 may be provided, and thus when abnormal pressures occur, the greater pressure on surface 54 forces ring 43 away from surface 42 and liberates the refrigerant. A means for arresting the axial movement of the shaft may include a shoulder 55 on the shaft 34 which normally is slightly spaced from a lug 56 on the end plate 45. After a slight axial displacement of the shaft 34, the lug 56 arrests the shaft and the refrigerant may escape past the ring 43 and out along the shaft 34.

Spring means may be provided to exert a slight axial pressure in order to maintain the ring 43 and the surface 42 in hermetic contact. For this purpose a ring 60 may be clamped within the end plate 45 and the shoulder 40. This ring 60 may be provided with radial fingers 61 which are axially resilient. These fingers 61 may bear against the wall 44 of the ring 47 to provide the necessary pressure against the ring 43. The end plate 45 may be clamped to the shoulder 40 by screws 65, and a gasket 66 may be interposed between the ring 60 and the end plate 45. The other end of the shaft 34 may be provided with a thrust bearing 70 adapted to bear against a bolt-like cap 71 threadedly secured in the extension 72 of the crankcasing 30.

The spring pressure exerted by the ring 60 can be a great deal less than the pressures heretofore necessary in this type of seal. It is not necessary to provide a spring pressure substantially equal to the maximum pressures caused by an unbalanced condition in the seal. Heretofore a substantial difference in the effective pressure distances of the hermetic connections has caused substantial pressures tending to separate the ring 43 and ring 42, but by our construction these pressures have been eliminated. The relatively great differential in pressures acting on the sealing ring heretofore have also been caused in seals by totally flexible walls which do not have the advantage of our rigid ring 47.

While the form of embodiment of the present invention as herein disclosed, constitutes a preferred form, it is to be understood that other forms might be adopted, all coming within the scope of the claims which follow.

What is claimed is as follows:

1. In a refrigerating apparatus wherein refrigerant is circulated under varying pressures, a casing, a shaft passing through said casing, a shoulder on said casing surrounding said shaft and forming a cavity subject to pressures within said apparatus, a radial bearing surface on said shaft, an end plate on said shoulder, a diaphragm hermetically connected to said end plate at an effective pressure distance from the axis of said shaft substantially equal to said bearing surface, a rigid ring provided with a bearing surface to cooperate with said first-named bearing surface, said ring and diaphragm being hermetically connected radially beyond said bearing surfaces and a ring with radial, axially resilient fingers for maintaining said bearing surfaces together.

2. In a refrigerating apparatus wherein refrigerant is circulated under varying pressures, a casing, a shaft passing through said casing, a shoulder on said casing surrounding said shaft and forming a cavity subject to pressures within said apparatus, a radial bearing surface on said shaft, an end plate on said shoulder, a diaphragm hermetically connected to said end plate at an effective pressure distance from the axis of said shaft substantially equal to said bearing surface, a rigid ring provided with a bearing surface to cooperate with said first named bearing surface, said ring and diaphragm being hermetically connected radially beyond said bearing surfaces and a ring with radial axially resilient fingers for maintaining said bearing surfaces together, said last named ring being clamped between said end plate and shoulder.

3. In a refrigerating apparatus wherein refrigerant is circulated under varying pressures, a casing, a shaft passing through said casing, a seal for said shaft including a flexible diaphragm surrounding said shaft and having hermetic connections with said casing and shaft, one of said connections being a sliding frictional hermetic connection between two faces axially urged together, the effective pressure distances of said connections from the axis of said shaft being only slightly different, one of said distances being only slightly greater to tend to separate said faces under abnormal pressure conditions, spring means to maintain said sliding connection hermetically sealed during normal conditions, and means to arrest axial movement of one of said faces to permit separation under abnormal conditions.

4. In a refrigerating apparatus wherein refrigerant is circulated under varying pressures, a casing, a shaft passing through said casing, a seal for said shaft including a flexible diaphragm surrounding said shaft and having hermetic connections with said casing and shaft, one of said connections being a sliding frictional hermetic connection between two faces axially urged together, the effective pressure distances of said connections from the axis of said shaft being only slightly different, one of said distances being only slightly greater to tend to separate said faces under abnormal pressure conditions, and means to arrest axial movement of one of said faces to permit separation under abnormal conditions.

In testimony whereof we hereto affix our signatures.

WARREN H. F. SCHMIEDING.
JESSE G. KING.